(12) United States Patent
Schäfer (10) Patent No.: US 9,592,960 B2
(45) Date of Patent: Mar. 14, 2017

(54) ORDER-PICKING METHOD AND ORDER-PICKING RACK ACCESSIBLE FROM TWO SIDES

(75) Inventor: Gerhard Schäfer, Neunkirchen (DE)

(73) Assignee: SSI Schäfer Noell GmbH Lager- und Systemtechnik, Giebelstadt (DE)

(*) Notice: Subject to any disclaimer, the term of this patent is extended or adjusted under 35 U.S.C. 154(b) by 1182 days.

(21) Appl. No.: 12/554,205

(22) Filed: Sep. 4, 2009

(65) Prior Publication Data

US 2010/0036675 A1 Feb. 11, 2010

Related U.S. Application Data

(63) Continuation of application No. PCT/EP2008/001749, filed on Mar. 5, 2008.

(30) Foreign Application Priority Data

Mar. 5, 2007 (DE) .................. 10 2007 011 856

(51) Int. Cl.
*G06Q 10/00* (2012.01)
*B65G 1/137* (2006.01)

(52) U.S. Cl.
CPC ........ B65G 1/1376 (2013.01); *B65G 2209/04* (2013.01)

(58) Field of Classification Search
USPC ........ 705/28, 1.1, 21, 16; 700/216; 414/273, 414/280; 340/568.1, 572.8
See application file for complete search history.

(56) References Cited

U.S. PATENT DOCUMENTS

| | | | |
|---|---|---|---|
| 4,814,742 A | | 3/1989 | Morita et al. |
| 5,472,309 A | * | 12/1995 | Bernard et al. ............... 414/807 |
| 5,733,098 A | | 3/1998 | Lyon et al. |
| 5,781,443 A | | 7/1998 | Street et al. |
| 5,880,443 A | * | 3/1999 | McDonald et al. .......... 235/375 |
| 6,061,607 A | * | 5/2000 | Bradley et al. ............... 700/216 |
| 6,289,260 B1 | * | 9/2001 | Bradley et al. ............... 700/216 |

(Continued)

FOREIGN PATENT DOCUMENTS

| | | |
|---|---|---|
| DE | 10 2004 058 216 A1 | 9/2009 |
| DE | 41 31 567 A1 | 9/2009 |

(Continued)

*Primary Examiner* — Vanel Frenel
(74) *Attorney, Agent, or Firm* — Renner, Otto, Boisselle & Sklar, LLP (57) ABSTRACT

A storage rack (30) for use in an order-picking system (100) includes a plurality of rack planes (44) being arranged on top of each other, which respectively comprise a plurality of rack compartments (46, 48) being arranged side-by-side, a filling side (34) and a removal side (32), being different to the filling side (34), wherein the removal side preferably is arranged oppositely, wherein the rack compartments (46, 48) are filled with articles (66-70) at the filling side (34), wherein the articles in term are removed at the removal side (32) for the purpose of order-picking, and a plurality of serving units (52), each of which comprises at least a display element (54), a transmitter (62) and a receiver (64) and is at least arranged such at the filling side (34) that each of the rack compartments (46, 48) is assigned to one serving unit (52).

20 Claims, 5 Drawing Sheets

(56) References Cited

U.S. PATENT DOCUMENTS

| | | | |
|---|---|---|---|
| 2005/0008463 A1* | 1/2005 | Stehr et al. | 414/277 |
| 2007/0050080 A1* | 3/2007 | Peck | 700/214 |
| 2008/0183328 A1* | 7/2008 | Danelski | 700/216 |
| 2009/0115613 A1* | 5/2009 | Piazza et al. | 340/572.8 |
| 2009/0138122 A1* | 5/2009 | Wagner | 700/226 |

FOREIGN PATENT DOCUMENTS

| | | |
|---|---|---|
| EP | 0 990 171 A | 6/1998 |
| EP | 0 860 382 A | 9/2009 |

\* cited by examiner

ORDER-PICKING METHOD AND ORDER-PICKING RACK ACCESSIBLE FROM TWO SIDES

RELATED APPLICATIONS

This is a continuation application of the co-pending International application PCT/EP2008/001749 (WO 2008/107175 A1) filed on 5 Mar. 2008 which claims priority of the German patent application DE 10 2007 011 856 filed on 5 Mar. 2007, which is fully incorporated herewith by reference.

BACKGROUND OF THE INVENTION

The present invention relates to a storage rack for usage in an order-picking system having a plurality of rack planes being arranged on top of each other, each of which includes a plurality of rack compartments arranged side-by-side.

The present invention further relates to an order-picking system comprising an article warehouse, at least one storage rack in accordance with the present invention, and a conveyor.

Additionally, the present invention relates to a method for order-picking articles, wherein the articles are manually picked in accordance with a picking order, and wherein the storage rack of the present invention is employed.

RELATED PRIOR ART

Such devices and methods are generally known in the prior art.

There are different order-picking methods known. Particularly, one-stage picking and two-stage picking processes are known. With a one-stage picking, a customer's order (picking order) is collected, based on an order-picking list, by an order picker walking around an article warehouse in an "one-stage" manner. This type of order-picking is also called "One Man, One Order!", or is designated as "man-to-goods-principal". A picking order consists of a number of order lines, wherein each order line in turn indicates how many articles of a predetermined type of article are needed by the customer, and thus have to be collected (picked). The articles are stored in storage containers in an exemplary container warehouse (article warehouse). The order picker walks through the warehouse and removes articles, in correspondence with the order lines of his picking order in a predetermined number, from the storage containers, and gives these into an order container, which the order picker has with him and to which the picking order is "married" (i.e. to which it is assigned).

With a two-stage picking, which is also designated "batch picking", a group of customers' orders (a "batch") is united in that articles in a required total amount are removed (picking by article) in a first stage, and the articles are distributed to orders (e.g. order containers) in a second stage (sorting by orders). A sorting, and thus a second picking stage, is most times realized by an automated sorting device.

A batch is a unification of a number of picking orders.

The document DE 10 2004 058 216 A1 entitled "Kommissionieranordnung für eine Apotheke" shows an order-picking system having at least one rack comprising a plurality of rack compartments each of which is formed for receiving an article, particularly a drug, further comprising at least one moveable transport device, which is connected to a positioning device and formed for receiving an article and moving same into a rack compartment, wherein the positioning device is formed for positioning the transport device in a region of a rack compartment, wherein the rack compartments respectively comprise a first rack-compartment opening and a second rack-compartment opening for inserting, retrieving and/or passing through an article, and wherein the positioning device is formed to move the transport device to a region in front of any rack-compartment opening, and wherein the transport device is formed to move the article in the rack compartment, out of the rack compartment and/or through the rack compartment.

The document U.S. Pat. No. 5,781,443 entitled "APPARATUS FOR USE IN PARTS ASSEMBLY" discloses a storage rack, which is employed at production sites where products consisting of a number of components are assembled in accordance with a modular concept. A classical example of use is an installation line in the automotive industry. The body of a vehicle to be assembled is carried on a centrally arranged assembly belt. Storage racks can be arranged laterally to the left end or the right with respect to the belt, the racks comprising a plurality of storage containers arranged side-by-side in planes which are arranged on top of each other. Above each plane, i.e. at a lower edge of the next higher located plane, a strip is provided comprising a plurality of display elements as well as transceiver pairs. The strip is facing the installation belt. The transceiver pairs are operated in the plane of a front of the rack. The transceiver pairs are formed such that the transmitter emits permanent beams so that a field of beams is formed in front of the opening of a storage container. As soon as a worker reaches with his hand into the storage container, in order to remove a component, the beams are reflected back from the hand towards the receivers. Preferably, a threshold value of the receiver is set so that a signal is only output if one actually grabs into the container. The receiver does not output a signal, if radiation is reflected either by the container itself or a strip beam located direct underneath. The above mentioned display is used for guiding the worker to the right storage container, and indicating to him a number of components to be removed. Thus, the system of the U.S. Pat. No. 5,781,443 allows guidance of a worker by means of the display, which is also designated "pick-by-light", and control or acknowledgement of a removal at the same time.

The German patent application DE 41 31 567 A1 relates to an order-picking guidance system. The order-picking guidance system of the DE 41 31 567 A1 includes two storage racks between which a conveyor, such as a belt conveyor, is arranged centrally. The belt conveyor is divided into a number of sections along the longitudinal direction thereof. The racks, which are arranged laterally thereto, are divided into corresponding longitudinal sections. Respectively, one section of the belt conveyor is assigned to a corresponding section of the rack. Thus, assigned sections are opposite in a transverse direction. Order containers are conveyed to the work station via the belt conveyor. Storage containers are stored in the rack. Articles are removed from the storage container for the purpose of order-picking articles, and given into corresponding order containers. The assignment happens in accordance with so-called picking orders. A picking order can be formed of a number of order lines. Each order line can comprise one or more articles.

The rack of the document DE 41 31 567 A1 is also divided into planes. Each plane is assigned an order-picking strip. Each order-picking strip comprises, dependent on the number of storage containers arranged above the order-picking strip, a corresponding number of display elements. The display elements are used for guiding an order picker ("pick-by-light"). To the order picker it is indicated by means of the display from which compartment or storage container which number of articles is to be grabbed, in order to give them into the order container assigned due to a picking order. Preferably, an acknowledge button is also provided so that a completed order-picking process can be acknowledged or confirmed. Hence, the order-picking guidance system of the DE 41 31 567 can work without "receipts", i.e. without leaflets.

Further, so-called automated small parts warehouses (SPW) are known. In this case, typically two racks are arranged oppositely, defining a rack aisle therebetween in which a storage and retrieval device can be moved for retrieving articles from the rack rows, the articles in turn being stored in load supports, such as storage containers or trays. This storage and retrieval device retrieves a load support, which is needed for completing an order-picking order, from the rack row, and gives same to another rack compartment at a front-side end. At a side of the rack arranged opposite to the storage and retrieval device, i.e. at the back side of the rack, another storage and retrieval device can take over the final transportation of the storage and retrieval device from the SPW to an order-picking station. The type of order-picking described here represents a two-stage picking process.

However, one drawback of a two-stage picking are the big efforts, which have to be made beforehand in order to form corresponding batches and for correspondingly controlling the storage machines (i.e. the storage and retrieval devices) and sorting devices so that a load support necessary for the completion of a picking order is at the right location at the right time.

This problem additionally gets worse, if humans are used for order-picking instead of automated storage machines. A human escapes from the absolute control of a superordinated warehouse management computer, which typically controls the storage machine.

SUMMARY OF THE INVENTION

Therefore, it is an object of the present invention to provide a storage rack serving as a buffer warehouse with a two-stage picking and which particularly allows manual picking. Particularly, the planning efforts associated with a two-stage picking are to be reduced.

This object is solved by means of a storage rack for usage in an order-picking system, wherein the storage rack comprises a plurality of rack planes being arranged on top of each other, each of which includes a plurality of rack compartments being arranged side-by-side, and which comprises a filling side and a removal side being different to the filling side, wherein the removal side preferably is arranged opposite to the filling side, wherein the rack compartments are filled with articles at the filling side, the articles in turn are removed for order-picking purposes at the removal side, and wherein the storage rack comprises a plurality of serving units, each of which comprises at least one display element, one transmitter and one receiver, and which are arranged along at least the filling side so that each rack compartment is assigned to a serving unit.

Further, the object is solved by an order-picking system comprising an article rack, a storage rack in accordance with the present invention, as well as a conveyor.

Additionally, the invention represents a method for order-picking articles, wherein the articles are manually picked in accordance with a picking order, wherein a storage rack is employed comprising a plurality of rack compartments, wherein each rack compartment is assigned to a serving unit comprising a transmitter, a receiver, and a display, wherein the method comprises the following steps: filling one or more rack compartments with one or more articles of one or more types of article at a filling side of the storage rack, wherein the filling is registered by means of the serving unit; operating a display of a rack compartment, which has been filled beforehand and in which articles are stored, which are needed for processing the picking order; and removing at a removing side, which is different to the filling side, the articles, which are required for the processing, from the filled rack compartment, which is assigned to the operated display.

The storage rack of the invention functions as a buffer warehouse. It can be accessed at two sides, wherein the rack compartments preferably are compartments for reaching through. A number of picking orders is united to form a batch for a two-stage picking, as mentioned above. Different articles belonging to a batch, the articles preferably being stored in storage containers, are retrieved from the article warehouse and have to be transported to an interim storage location subsequently, for being picked finally. In accordance with the present invention, a rack compartment can be selected freely in this context, into which the articles are to be delivered, if they are removed from the storage container. The serving unit being provided at the filling side of the storage rack registers the location (rack compartment) and preferably the number of articles. Thus, it is possible to preferably occupy rack compartments which can be reached fast and easy at the opposite removal side (short ways). Also, short ways are ergonomically favorable. As soon as a rack compartment has been emptied at the removal side, the rack compartment can be filled once again at the filling side.

This is particularly advantageous if humans are employed for filling and emptying (picking). A human can decide on its own into which of the rack compartments articles to be filled are to be given. Of course, this selection will be such that the human has to walk as less as possible. Thereby, the ways are reduced, and thus the time required for filling the rack. However, this does not only apply for humans but also when storage machines are employed.

Storage containers can be completely resolved. They do not have to be moved back into the article warehouse. This reduces the number of exchange cycles while a performance is steady.

The (interim) storage rack of the present invention is thus highly dynamical and flexible. One does not need to plan in advance which article is to be put into which rack compartment. Thereby, the planning effort is reduced for the warehouse management system.

In accordance with a preferred embodiment each rack compartment is respectively assigned its own serving unit.

Thus, a one-to-one assignment occurs between a rack compartment and a serving unit. It can be ensured that there are no misassignments between articles and corresponding rack compartments.

Further, it is preferred if each rack compartment, at the removal side, is additionally assigned a display, and preferably a transmitter and a receiver as well.

In this case, it can be checked on both the filling side and the removal side at any time which of the rack compartments is accessed, or which of the rack compartments has to be accessed. A confirmation can be performed in an automated manner by means of the transmitter and receiver. The display is used for indicating, particularly to the order picker, how many articles are to be taken at the removal side of which rack compartment. Thus, the process of filling as well as the process of emptying the (interim) storage rack is registered, checked and corrected, if necessary.

In accordance with another embodiment the serving unit further comprises an entry element for allowing entry of a number of articles removed from the rack compartment, or a number of articles given to a rack compartment.

Entry elements are particularly advantageous at the side from which the storage rack is filled. Particularly, if storage containers are to be completely resolved, the number of articles actually given to the rack compartment can be entered in a first step, and in a second step the remaining articles can be given or put in another rack compartment, wherein the number is indicated at the same time.

Additionally, it is advantageous if the serving unit is realized in terms of a strip, which is arranged above and/or beneath a rack plane.

A spatial assignment between a serving unit and a rack compartment is thus provided in a simple manner. This assignment can also be recognized optically, particularly by humans.

In accordance with a preferred embodiment the transmitter defines a field of beams for covering an opening of a rack compartment, and the receiver is adapted to receive reflected beams from the transmitter, if the opening is crossed by an object, preferably an operator's hand.

In this manner, for example, a light grid can be realized allowing delivery of signals, in order to allow detection and check of an action at a predetermined rack compartment. In this context, the detected signal is delivered preferably to a superordinated warehouse management system for further processing.

In accordance with another particular embodiment the display element is an array of LED displays, or a single light-emitting diode.

The number of articles to be removed can be visually depicted in a simple manner by means of a LED-display array. The individual light-emitting diodes can be used, if a rack compartment is only to be marked and the number of articles to be put to the rack compartment or to be retrieved therefrom is not important.

Further, it is preferred if the serving unit comprises an acknowledgement button. Any action can be additionally confirmed (manually) by means of the acknowledgement button. This is another safety stage for the order-picking process.

According to another aspect of the invention, an order-picking system is provided, wherein articles to be picked can be transported away via the conveyor, wherein the conveyor comprises preferably one or more order-picking stations ("Kommissionierbahnhöfe") which are assigned, at the removal side, respectively to a predetermined section of the storage rack, the section can be operated by a putting worker (operator), and wherein the storage rack is divided, at the filling side, into a plurality of other sections which are assigned, at the removal side, to one or more sections and which can be served by a picking person (operator).

Since, as a rule, the process of picking (second stage) is more time consuming than the process of filling the rack (first stage) at both sides of the rack differently sized sections can be defined. Thus, for example, it is possible that a putting person, who fills the rack (from behind) operates two order-picking zones each of which can have an order-picking station. The picking persons, who retrieve articles from the storage rack within the order-picking zone, in order to put them, for example, in an order container, have to walk to exactly determined rack compartments due to a pregiven picking order, and therefore can not reach into an arbitrary rack compartment, as the putting person can, so that longer ways and longer processing times can occur for the picking process.

The assignment and selection of the size of the regions of action for the picking persons and putting persons thus are freely selectable. This is of particular advantage, if a picking person or a putting person makes or needs to make a break. In this case, the sections can be varied in short-time and short-term, so that a putting person, for example, serves additional picking persons, and vice versa.

Further, it is preferred if additionally a superordinated warehouse management system is provided which controls by means of the serving units the filling and emptying of the rack compartments for the purpose of processing picking orders.

In accordance with a preferred embodiment of the method of the present invention a rack compartment can be freely selected with the step of filling, wherein an information on which article is filled into which rack compartment is transmitted to a superordinated warehouse management system with a registration. The type of article results from the type of article being retrieved from the article warehouse. This information is known. Location and number result from the process of filling by the picking person.

The warehouse management system processes the information, and subsequently controls the display of the rack compartments at the removal side, for allowing to remove the buffered articles corresponding to the picking orders which are just to be processed.

Additionally, it is advantageous if free rack compartments to be filled are indicated by means of a display of an assigned serving unit.

In this manner, it is easy for the picking person to find an empty rack compartment in a fast and reliable manner.

In accordance with a preferred embodiment the display shows the number of articles which are to be given to the assigned rack compartment.

In this manner it is excluded that the putting person puts a wrong number of articles in the rack compartment. Preferably, the display of each empty rack compartment is illuminated by the number which is to be filled. The putting person thus finds empty rack compartments fast and easy, wherein it is simultaneously ensured that the right number of articles is given to an empty rack compartment.

In accordance with another particular embodiment the articles are retrieved from the article warehouse in a load support, and transported to the filling side.

Further, it is preferred if all articles located in one of the retrieved load supports are buffered in the storage rack.

In this manner, the load support can be completely emptied, and does not need to be transported back into the article warehouse. Thereby, the number of exchange cycles reduced.

Particularly, the picking order can be a negative picking order.

With a "negative" picking order articles are transported via the conveyor to the removal side of the storage rack where the picking person puts back the articles in the rack. The putting person in turn can take the articles from the filling side and bring the same back into the article warehouse, so that a direction of article flow is inverted, i.e. becomes negative.

This approach can be applied during times of low amounts of order-picking processes. While at some work stations one picks conventionally, i.e. articles leave the article warehouse, the article warehouse can be filled (at the same time) at other work stations by inverting the article flow. Thus, it is ensured that all work stations are used to capacity at any time.

In accordance with another particular embodiment, return articles are filled via the removal side into the storage rack, in order to be available subsequently for processing a new picking order.

Thus, return articles do not need to be stored again in the article warehouse for subsequently being provided for the purpose of a new picking process, but can be stored directly into the interim rack, in order to be picked again immediately. Thereby, the effort in use by the return articles is reduced. Thus, return articles leave the order-picking system in an inverted manner again. The handling is dramatically simplified. The work effort associated with returns is reduced.

It is clear that the above mentioned and hereinafter still to be explained features cannot only be used in the respectively given combination but also in other combinations or alone, without departing from the scope of the present invention.

BRIEF DESCRIPTION OF THE DRAWINGS

Embodiments of the invention are illustrated in the drawings and will be explained in more detail in the following description, in which.

PREFERRED EMBODIMENTS OF THE INVENTION

In the following drawings same elements will be designated with same reference numerals. The storage rack of the present invention is generally designated by 30. The order-picking system in accordance with the invention is generally designated by reference numeral 100.

Figure 1:
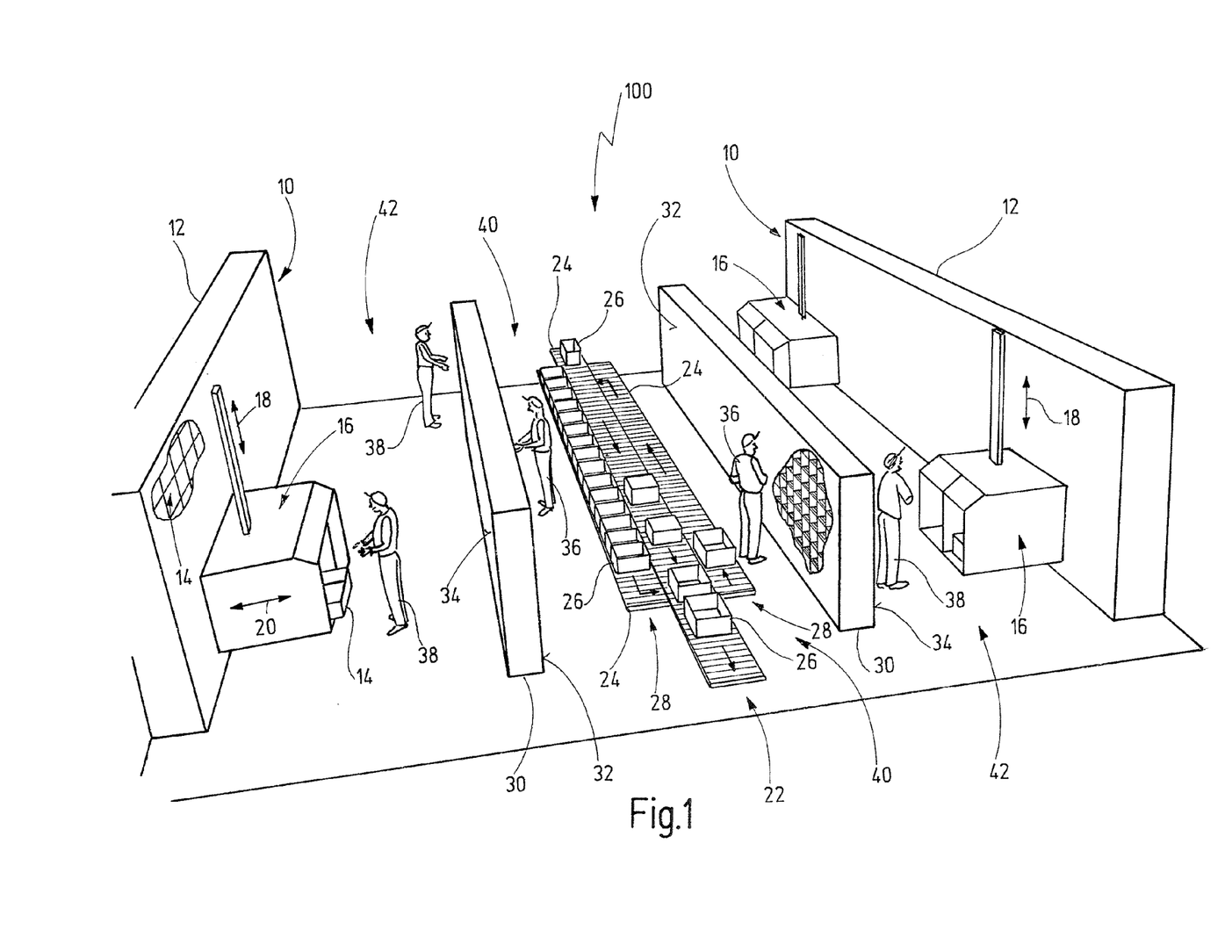
FIG. 1 shows a schematic perspective view of an order-picking system in accordance with the present invention comprising storage racks in accordance with the present invention.

With reference to FIG. 1 a perspective schematic view of an order-picking system 100 in accordance with the present invention is shown.

The order-picking system 100 in accordance with the present invention comprises one or more article warehouses 10, which in turn comprise racks 12, preferably container racks. The racks 12 are merely indicated schematically in FIG. 1. Storage racks 14 are exemplarily illustrated partially in the rack 12 being shown in FIG. 1 at the left side.

For example, vertical elevators 16 are arranged along a longitudinal side of the rack 12 in an arbitrary number, and are movable in a vertical direction 18 so that different planes of the rack 12 can be reached. The elevator 16 can particularly comprise load-suspension devices (not illustrated) by means of which storage containers or other load supports, such as trays, can be moved in a horizontal direction between the racks 12 and the elevator 16, and hence can be exchanged. Thus, the elevator 16 retrieves storage containers 14 from the article warehouse 10, and provides them preferably at a lower end thereof for the purpose of further processing.

Two article warehouses 10 are shown in FIG. 1, which are facing each other and have centrally arranged a conveyor 22 therebetween. Here, the conveyor 22 is implemented in terms of a roller track 24. However, the central conveyor 22 could be of any arbitrary type, such as a belt conveyor.

Particularly, order containers 26 are transported to order-picking stations 28 via the central conveyor 22. In the same manner, direct picking on a belt including a subsequent handing over to the container is possible. Transport directions are indicated on the conveyor by means of dark arrows. In the example of FIG. 1 containers 26, to which articles are picked later, are transported from a back part of the figure to a front part of the figure. An additional roller track 24 is respectively arranged laterally with respect to the central conveyor 22, wherein both of the lateral roller tracks are preferably operated in opposite directions. Order containers 26 are directed to the order-picking stations 28 by means of directing devices (not shown), and thus are provided for picking. Since the order-picking stations 28 are operated in opposite directions, it is possible that order containers are partially pre-picked in one order-picking station, and subsequently are processed completely in an adjacent order-picking station. Also, parallel picking is possible.

The order-picking stations 28 respectively face a storage rack 30 which is formed in accordance with the present invention as will be explained in more detail in the following. The storage racks 30 are arranged between the article warehouses 10 at the central conveyor 22 as well as the order-picking stations 28. The longitudinal axes of the racks 30 extend preferably parallel relative to the longitudinal axes of the racks 12 of the article warehouse 10 and the central conveyor 22.

The storage racks 30 respectively comprise a removal side 32 and a filling side 34. The removal side 32 is here facing the central conveyor 22. The filling side 34 is here facing the article warehouse 10.

Each of the storage racks 30 preferably comprises a plurality of storage compartments, as it will be explained in greater detail in the context of FIG. 2.

In the example of FIG. 1 the order-picking system 100 is manually operated. In regions between the article warehouse 10 and the storage rack 30, as well as between the storage rack 30 and the central conveyor 22, operators are working. Persons working in a region between the storage rack 30 and the central conveyor 22 will hereinafter be designated as "putting persons" 36. The putting persons 36 remove articles from the storage rack 30 and deliver ("put") same to the containers 26 being located, preferably at predetermined, locations in associated order-picking stations 28. Operators working between a storage rack 30 and an assigned article warehouse 10 will hereinafter be designated "picking persons" 38. The picking person 38 removes articles (here not illustrated), which are provided preferably in storage containers 14, from the elevators 16, and then distributes these articles at the filling side 34 into the storage rack 30.

The region between the storage rack 30 and the central conveyor 22, where a putting person 36 works, will hereinafter also be called a putting region 40. The region between the article warehouse 10 and the storage rack 30, where the picking person 38 works, will hereinafter also be called picking region 42.

The article flow in the order-picking system 100 of FIG. 1 normally can be described as follows:

Articles (being not explicitly illustrated in FIG. 1) are retrieved from the article warehouse 10, preferably in storage containers 14. The retrieval happens particularly in an article orientated manner (first stage). For this purpose, the storage containers 14 are filled with articles, particularly of one type only. The retrieval from the rack 12 occurs by means of the vertical elevator 16 which takes over the storage containers 14 from the rack 12 by using its load-suspension device (not shown) in a horizontal direction 20. Since the vertical elevators, as a rule, are only movable in a vertical direction 18, storage machines can be provided at the side of the rack 12 located opposite relative to the elevator 16, the storage machines substantially transporting of the storage containers between storage locations in a longitudinal direction. These storage machines are not shown in FIG. 1.

After the elevator 16 has received a desired storage container 14, the elevator is driven particularly into its foot region, so that a picking person 38 can remove the storage container 14. The picking person 38 empties the storage container 14, particularly completely, by given the articles which are contained in the storage container 14 in the storage rack 30 at the filling side 34.

Then, a putting person 36 can remove the articles in the putting region 40, and gives same in a predetermined storage container 26 for processing a picking order (second stage).

Figure 2:
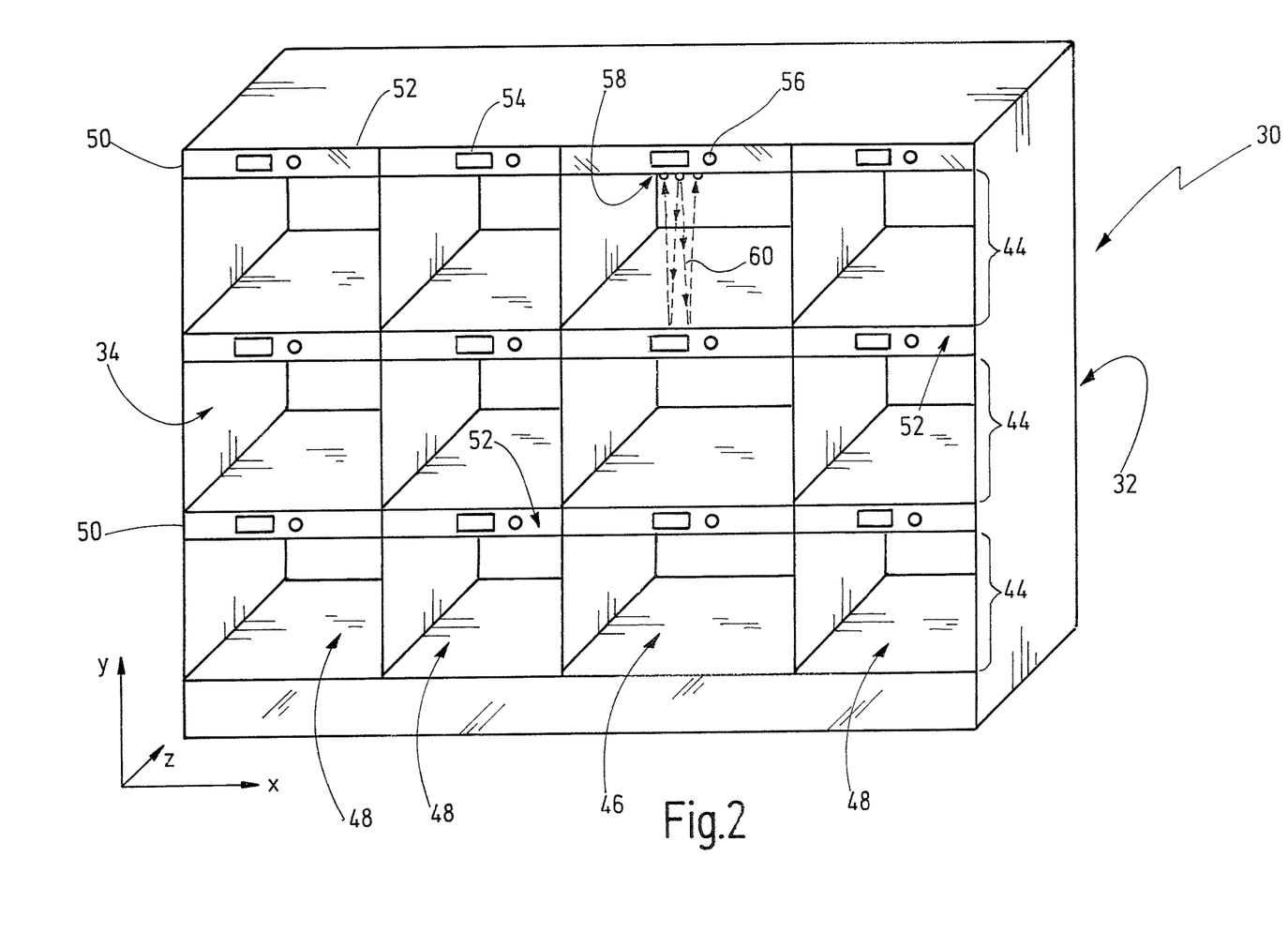
FIG. 2 shows a schematic perspective view of a storage rack in accordance with the invention.

With reference to FIG. 2 a storage rack 30 in accordance with the present invention is shown in more detail in a perspective view.

The storage rack 30 particularly comprises a number of rack planes 44, which are divided into a plurality of rack compartments arranged side-by-side. Rack compartments having two different sides are shown in FIG. 2, namely a smaller rack compartment 48 and a bigger rack compartment 46. A second column on the right hand side is formed of big rack compartments 48, the remaining rack compartments being small rack compartments 48.

Above and/or beneath each rack plane 44, a strip 50 for receiving serving units 52 is arranged. A serving unit 52 comprises a display 54, and, optionally an acknowledgement button 56. The serving unit 52 further comprises a transmitter-receiver pair 58 for generating a field 60 of beams, which is preferably arranged in a plane, in which an opening of the rack compartment is arranged as well. In FIG. 2 only one single transmitter-receiver pair 58 is illustrated. However, it is clear that each rack of the rack compartment of FIG. 2 can be equipped with one or more transmitter-receiver pairs 58 for covering, particularly completely, each opening with a field 60 of beams.

In FIG. 2, one looks to the filling side 34 of the storage rack 30. It is clear that the removal side 32 can be constructed and arranged in the same way like the filling side 34. Further, it is clear that a serving unit 50 can be assigned to one or more rack compartments 46, 48, which are preferably arranged side-by-side. However, it is particularly preferred if each rack compartment 46, 48 is assigned its own serving unit 50. Particularly, at the filling side 34 it is advantageous if each rack compartment 46, 48 is assigned its own field 60 of beams, in order to detect the filling of the articles and to allow transmission to a superordinated warehouse management system. If a single serving unit 52 is assigned to a number of rack compartments at the same time, then even a number of transmitter-receiver pairs 58 is preferably provided so that it can be detected which of the assigned rack compartment is actually accessed.

The displays 54 can also be used for indicating empty rack compartments 46, 48. Particularly, the number of articles, which are just given into the storage rack 30, are indicated by means of the displays 54. The display 54 can be implemented in terms of an array of LEDs or a single lamp. If the display 54 is a single lamp, for example at the elevator 16 (cf. FIG. 1) an additional display (not shown) can be provided, showing the number of storage-container articles, the storage container being just presented by the elevator 16, wherein the number of articles is to be loaded in the storage rack 30. Then, the display 54 can also be omitted completely, since the putting person 38, as a rule, independently recognizes which of the rack compartments 46, 48 is empty. If instead of a human a storage machine is to be used for filling the storage rack 30, then the storage machine could be provided with a device for determining whether or not a rack compartment 46, 48 is empty.

Also, the acknowledgement button 56 merely represents an optional feature of the serving units 52. The acknowledgement button 56 can be used for indicating to the superordinated warehouse management system that a filling process is terminated. Although this method could also be performed by means of the transmitter-receiver pairs 58, the acknowledgement button 56 represents, however, an additional safety stage. But the acknowledgement button 56 can also be omitted.

Further, it is clear that the field 60 of beams can be orientated arbitrarily with respect to the openings of the rack compartments 46, 48. In FIG. 2 a vertical orientation is illustrated. However, the orientation could also be horizontal or under an arbitrary angle. Also, the field 60 of beams does not need to flush with the edges of the openings of the respective rack compartments 46, 48. The field 60 of beams can be inclined with respect to a vertical plane (e.g. towards an inner space of a rack compartment 46, 48).

Figure 3:
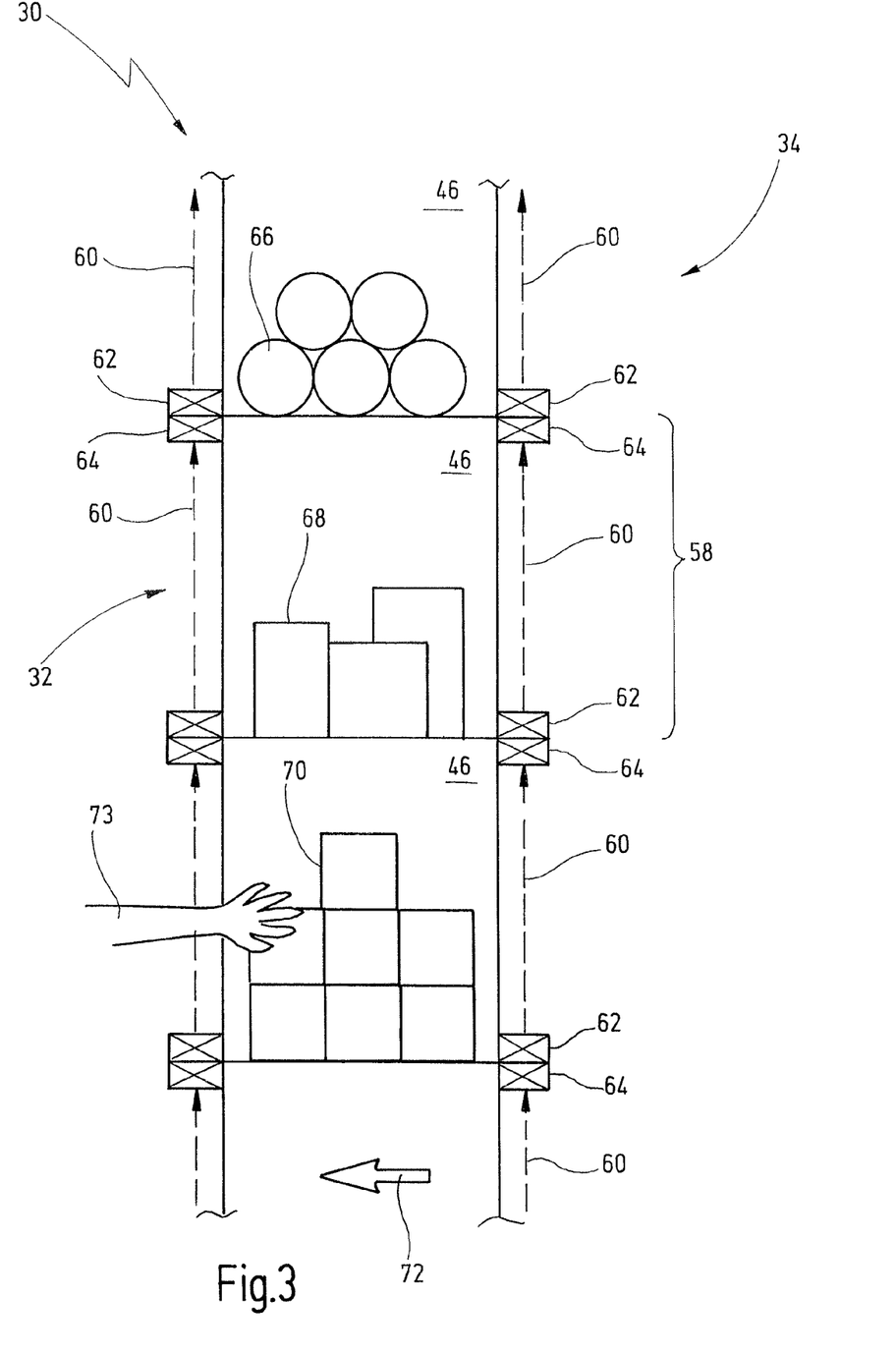
FIG. 3 shows a schematic side view of a storage rack in accordance with the present invention.

With reference to FIG. 3 a schematic side view of a part of the storage 30 of FIG. 2 is shown, which has not been amended with the exception of the transmitter-receiver pair 58.

The transmitter-receiver pair 58 of FIG. 3 is here formed by spatially separated transmitters 52, each which has assigned one or more receivers 64 being arranged oppositely. In the example of FIG. 3 the transmitters 52 emit, from a strip located at a lower edge of the opening, towards the receivers 64 which are arranged in a strip located at an upper edge of the opening.

In FIG. 3 three rack compartments 46 are already loaded with different articles 66, 68 and 70. The loading of the rack compartments 46 preferably happens by one sort only. The articles 66 through 70 respectively represent a different type of articles.

In the right half of FIG. 3 a filling side 34 of the storage rack 30 is shown. In the left half of FIG. 3 the removal side of the storage rack 30 is shown. Here, one can clearly see that on both sides 32 and 34 fields 60 of beams are provided, in order to monitor access at both of the sides of the rack compartments 46.

With a conventional processing of picking orders a material flow happens towards an arrow 72 having a light appearance, i.e. happens from the filling side 34 towards the removal side 32, as it is exemplarily indicated by means of a hand 73 which can belong to one of the picking person 36 (cf. FIG. 1).

In FIG. 3 the hand 73 reaches in the lower rack compartment 46 being filled, in order to remove one or more articles 70. As soon as the hand 73 crosses the field 60 of beams, a corresponding signal is transmitted to the superordinated warehouse management system, which registers this process.

By means of displays being provided at the removal side 32 (not shown in FIG. 3), also the number of articles being removed can be indicated so that the picking person is guided by light to the right rack compartment 46 for processing a picking order. This manner of order-picking is also called "pick-by-light".

Figure 4:
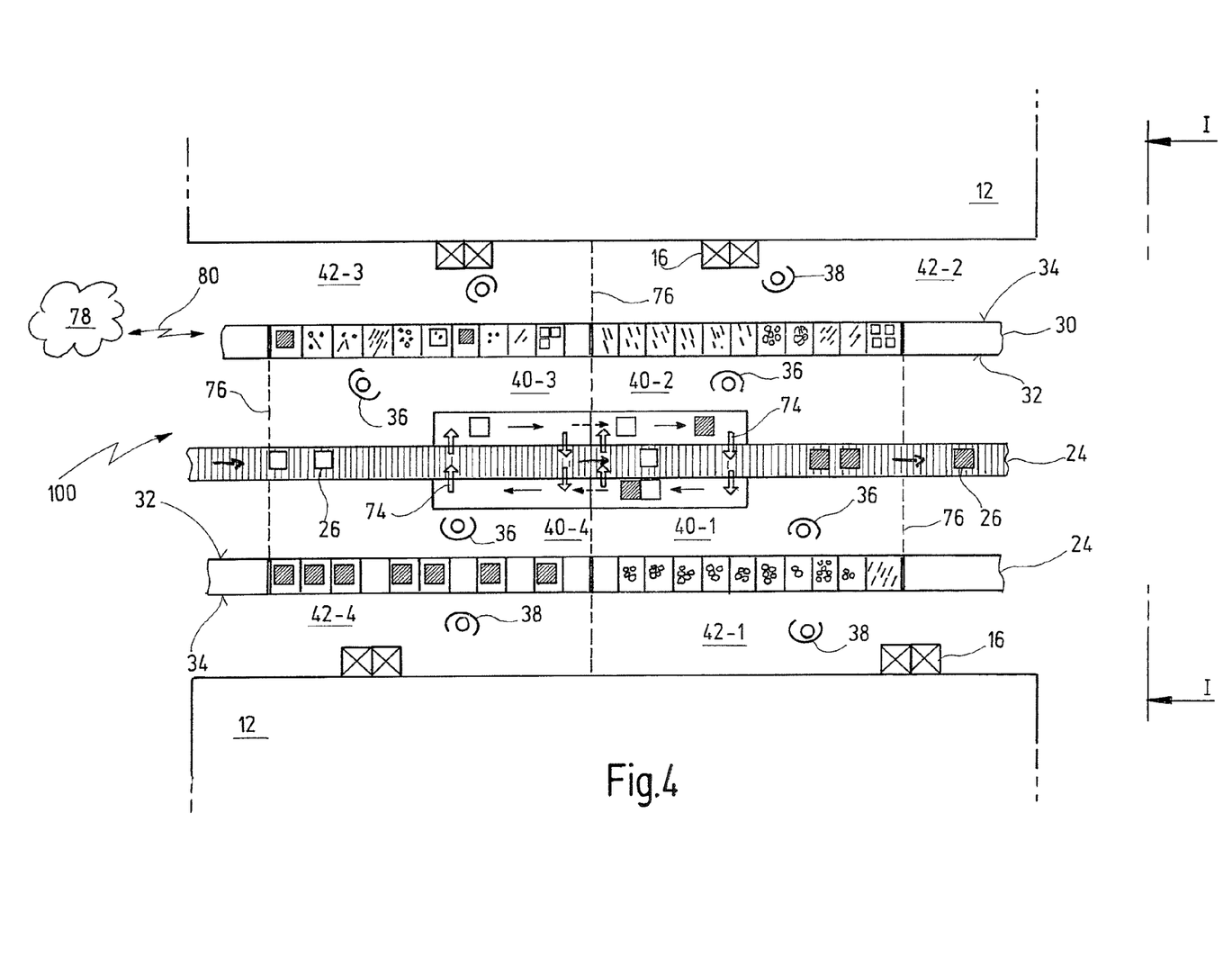
FIG. 4 shows a top view of the order-picking system of FIG. 1.

With reference to FIG. 4 a schematic top view of the order-picking system 100 of FIG. 1 is illustrated.

In FIG. 4 the centrally extending central roller track 24 can be recognized, to which four working stations or picking regions 40-1, 40-2, 40-3 and 40-4 are laterally coupling. Here, the picking regions 40 are respectively operated by one picking person 36, and are limited by broken lines 76. Each putting region is provided with an order-picking station, which are implemented here in terms of belt conveyors. For discharging an order container 24 into an order-picking station, or for discharging same from an order-picking station on the central conveyor 24, discharging devices 74 are provided, which are indicated in FIG. 4 by means of light arrows. Light order containers 26 are representing empty order containers. Dark-shaded order containers 26 are representing completed order containers.

Further, FIG. 4 shows that the storage racks 30 are divided in a number of sections, as indicated by means of bold-printed lines. In FIG. 4 four storage racks can be recognized. Each of the storage racks is here unambiguously assigned to one of the putting regions 40. The storage racks are partially filled with loose articles as indicated by dots and strokes. However, they can also be filled with containers as indicated by squares.

The supply happens via the picking regions 42-1, 42-2, 42-3 and 42-4. The picking regions 42 can be bigger than the putting regions 40, particularly as a length extension is concerned. A picking person 38 also can supply a number of storage racks 30, or a number of putting regions 40, "from the back" with articles. Here, the articles are provided via the vertical elevators 16. Instead of the vertical elevators 16, however, a conveyor or similar can also be employed for supplying the articles from the articles warehouse 10 to the picking region 42.

It is clear that the workflow can also be inverted.

At times of low rates of utilization, one cannot only order pick by usage of the storage rack 30, but store as well. This process can happen at the same time as the picking happens, or can happen separately from the picking.

With a storing process, full "order containers 26", which are here operated as storage containers, are transported over the central conveyor 22 in the putting regions 40. The putting persons 36 remove the articles, and give them into the storage racks 30, wherein they can also arbitrarily select rack compartments, as earlier the person persons 38 could do, in order to fill the rack compartments. The picking persons 38 can then remove articles being located in the racks 30, and store back the articles via the elevator 16 into the rack 12. However, the articles can also stay in the rack 30.

In this manner a "negative" picking order can be processed.

This operation is particularly interesting for return articles.

Typically, return articles are transported via a normal receipt of goods into the article warehouse 10 (cf. FIG. 1). The return articles require a particular handing, because, for example, it needs to be determined whether the article can be stored back due to its durability. As a rule, many different types of articles are delivered in respectively small numbers in terms of return goods, so that many compartments in the article warehouse are given away, if respectively one return article is given, for example, into one storage container which usually can take a number of articles of this type of return article.

In accordance with the invention the return articles are transported over the central conveyor into the region 40 which is normally used for picking. The putting person 36 removes the return article, and puts it into an empty rack compartment. This is registered by the superordinated warehouse management system 78 which is connected to the serving units by means of connections 80 (here being depicted wirelessly). The warehouse management system 78 then preferably tries to consume the return articles, preferably at the processing of subsequent picking orders, so that storing back into the article warehouse 10 just is not needed. This procedure has proved extremely efficient, particularly since less storage cycles are needed, and less space for return articles is needed. Additionally, the return articles are "consumed" faster, which is of particular interest with respect to short durability terms.

Figure 5:
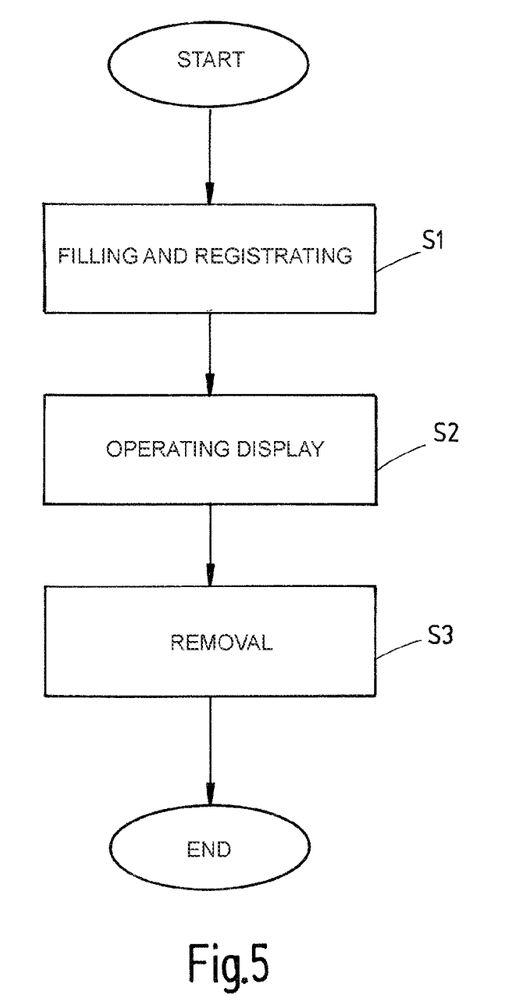
FIG. 5 shows a flow chart for explaining the method in accordance with the present invention.

In FIG. 5 the method in accordance with the invention is illustrated in terms of a flow chart. In a first step S1 a number of rack compartments is filled with one or more articles of one or more types of articles at a filling side of the storage rack, wherein the filling is registered by means of the serving unit.

In a step S2 the articles required for processing are removed from the filled rack compartments, wherein the rack compartment has been assigned to the actuated display beforehand.

In a step S3 the articles are taken from the removal side.

Therefore, what we claim is:

I claim:

1. An order-picking system having a storage rack for usage in an order-picking system comprising:
   a plurality of rack planes being arranged on top of each other and respectively comprising a plurality of rack compartments being arranged side-by-side, a filling side, and a removal side, which is different to the filling side, wherein the rack compartments are configured to enable manual filling by a picking person with articles at the filling side and to enable manual removal of the articles by a putting person at the removal side for the purpose of order-picking; and
   a plurality of control units, each of which comprises at least a first display element, a transmitter and a receiver, and is at least arranged at the filling side such that each of the rack compartments is assigned to one of the control units, and, at the removal side, at least a second display element assigned to each of the rack compartments, wherein the first display element visually guides the picking person to each of the rack compartments to be filled and the second display element visually guides the putting person to each of the rack compartments from which to remove the articles.

2. The storage rack of claim 1, wherein the removal side is arranged oppositely to the filling side.

3. The storage rack of claim 1, wherein, at the removal side, a transmitter and a receiver is additionally assigned to each of the rack compartments.

4. The storage rack of claim 1, wherein the control unit further comprises an entry element for entering a number of articles to be removed from one of the rack compartments, or a number of articles to be given to one of the rack compartments.

5. The storage rack of claim 1, wherein the control unit is realized in terms of a strip, which is arranged above or beneath a rack plane.

6. The storage rack of claim 1, wherein the transmitter defines a field of beams for covering an opening of one of the rack compartments, and wherein the receiver is adapted to receive reflected beams of the transmitter, if the opening is crossed by an object.

7. The storage rack of claim 6, wherein the object is an operator's hand.

8. The storage rack of claim 1, wherein the display element is an array of LED displays, or a single light emitting diode.

9. The storage rack of claim 1, wherein the control unit further comprises an acknowledgment button.

10. An order-picking system comprising an article warehouse, a storage rack, and a conveyor, wherein the storage rack is arranged between the article warehouse and the conveyor, the storage rack comprising:
   a plurality of rack planes being arranged on top of each other and respectively comprising a plurality of rack compartments being arranged side-by-side, a filling side, and a removal side, which is different to the filling side, wherein the rack compartments are configured to enable manual filling with articles at the filling side and manual removal of the articles at the removal side for the purpose of order-picking; and
   a plurality of control units, each of which comprises at least a first display element, a transmitter and a receiver, and is at least arranged at the filling side such that each of the rack compartments is assigned to one control unit, wherein, at the removal side, at least a second display element is additionally assigned to each of the rack compartments, wherein the first display element enables visual guidance of the picking person to each of the rack compartments to be filled and the second display element enables visual guidance of the putting person to each of the rack compartments from which to remove the articles.

11. The order-picking system of claim 10, wherein the conveyor comprises one or more order-picking stations, which are respectively assigned, at the removal side, to a predetermined section of the storage rack operable by a putting person, and wherein the storage rack is divided, at the filling side, into a plurality of further sections being assigned to the one or more of the sections at the removal side and operable by a picking person.

12. The order-picking system of claim 10, further comprising a superordinated warehouse management system for controlling filling and emptying processes for the rack compartments in order to process picking orders by means of the control units.

13. A method for order-picking articles, wherein the articles are manually picked in accordance with a picking order, wherein a storage rack is used which comprises a plurality of rack compartments having a filling side and a removal side which is different to the filling side, wherein each of the rack compartments, at the filling side, is assigned to a control unit, which comprises a transmitter, a receiver and at least a first display element, and wherein, at the removal side, at least a second display element is additionally assigned to each of the rack compartments, the method including the following steps:
   operating the first display element for each of the rack compartments to be filled;
   manually filling of one or more of the rack compartments assigned to the first operated display element with one or more articles of one or more types of article at a filling side of the storage rack,
   registering the filling of each of the rack compartments by means of the control unit;
   operating the second display element of one of the rack compartments, which have been filled earlier and in which articles are stored, which are required for processing the picking order; and
   manually removing the articles which are required for the processing from the filled rack compartment, which is assigned to second operated display element.

14. The method of claim 13, wherein one of the rack compartments is freely selected at the step of filling, and wherein an information on which of the articles has been filled into which of the rack compartments is transmitted to a superordinated warehouse management system at the step of registration.

15. The method of claim 14, wherein the display element indicates the number of articles which are to be given into the assigned rack compartment.

16. The method of claim 13, wherein the articles are retrieved from in load support from the article warehouse, and transported to the filling side.

17. The method of claim 16, wherein all of the articles being located in one of the load supports are buffered in the storage rack so that the load support is empty after the filling of the storage rack.

18. The method of claim 13, wherein the picking order is a negative picking order so that the articles are filled at the removal side into the article warehouse for the purpose of storing back or just storing, and are removed at the filling side, in order to be transported to the article warehouse.

19. The method of claim 13, wherein return articles are filled in the storage rack at the removal side, in order to be subsequently available for processing a new picking order.

20. An order-picking system having a storage rack for usage in an order-picking system comprising:
   a plurality of rack planes being arranged on top of each other and respectively comprising a plurality of rack compartments being arranged side-by-side, and having a first side comprising a filling side and a second side comprising a removal side, wherein the rack compartments are configured to enable manual filling with articles at the filling side by a picking person and manual removal of articles from the rack compartments at the removal side by a putting person for the purpose of order-picking; and
   at least a first display assigned to each of the rack compartments arranged at the filling side to visually indicate to the picking person the rack compartment to be filled;
   at least a second display assigned to each of the rack compartments at the removal side to visually indicate to the putting person the rack compartment from which to remove the articles.

* * * * *